US006290375B1

(12) United States Patent
LeVasseur

(10) Patent No.: US 6,290,375 B1
(45) Date of Patent: Sep. 18, 2001

(54) BALLAST HOUSING HAVING PIVOTALLY ENGAGING MOUNTING MEANS

(75) Inventor: Craig LeVasseur, Camarillo, CA (US)

(73) Assignee: Cooper Technologies Company, Houston, TX (US)

(*) Notice: Subject to any disclaimer, the term of this patent is extended or adjusted under 35 U.S.C. 154(b) by 0 days.

(21) Appl. No.: 09/527,112

(22) Filed: Mar. 16, 2000

(51) Int. Cl.[7] ....... B60Q 1/00

(52) U.S. Cl. ....... 362/368; 362/374; 362/375; 174/50; 174/52.1; 174/58; 174/220; 174/3.2; 174/3.92; 174/361; 174/674

(58) Field of Search ....... 362/374, 368, 362/373, 375, 362, 372; 174/50, 51, 52.1, 52.4, 53, 54, 58, 61, 62; 361/600, 601, 602, 603, 623, 674–676, 724–727; 220/3.2, 3.3, 3.8, 3.9, 3.92, 3.94, 4.02, 4.01, 4.28, 4.29–4.33, 478, 480, 481

(56) References Cited

U.S. PATENT DOCUMENTS

D. 387,333 * 12/1997 Pellow et al. ....... D13/184
2,308,600 * 1/1943 Gaynor ....... 220/3.94
2,489,245 * 11/1949 Sola ....... 220/3.2
2,550,362 * 4/1951 Logie ....... 220/3.94
3,751,574 * 8/1973 Fisher ....... 174/52.1
3,851,225 * 11/1974 Lucheta ....... 361/674
5,249,099 * 9/1993 Sridharan et al. ....... 361/674
5,446,617 * 8/1995 Blocher et al. ....... 361/674
5,566,047 * 10/1996 Kahn et al. ....... 361/674
6,175,487 * 1/2001 McCartney et al. ....... 361/674

* cited by examiner

*Primary Examiner*—Sandra O'Shea
*Assistant Examiner*—Ismael Negron
(74) *Attorney, Agent, or Firm*—John E. Wagner; Robert C. Smith; Sam Bernardo

(57) ABSTRACT

A ballast housing having a uniform generally rectangular cross section is formed, preferably by extrusion, to accommodate any of a number of ballasts of varying sizes. Exterior sidewalls are formed with longitudinal grooves, one of which contains a pair of cylindrical members. A separate mounting plate carries screws which contact the cylindrical members and permit the cylindrical members to act as hinges permitting the housing to pivot away from the mounting plate. Closure plates are secured to each end of the housing and standard threaded ports may be formed in each closure plate as well as in the extruded member for mounting lighting fixtures or conduits carrying wires. Mating openings are formed on the backside of the housing member and the mounting plate for the passage of power leads to the ballast in the housing. With the mounting plate secured to a wall or junction box, by removal of a pair of small screws, the ballast housing may be easily pivoted away from the mounting plate for inspection or servicing of the wiring or the ballast.

18 Claims, 4 Drawing Sheets

FIG. 1
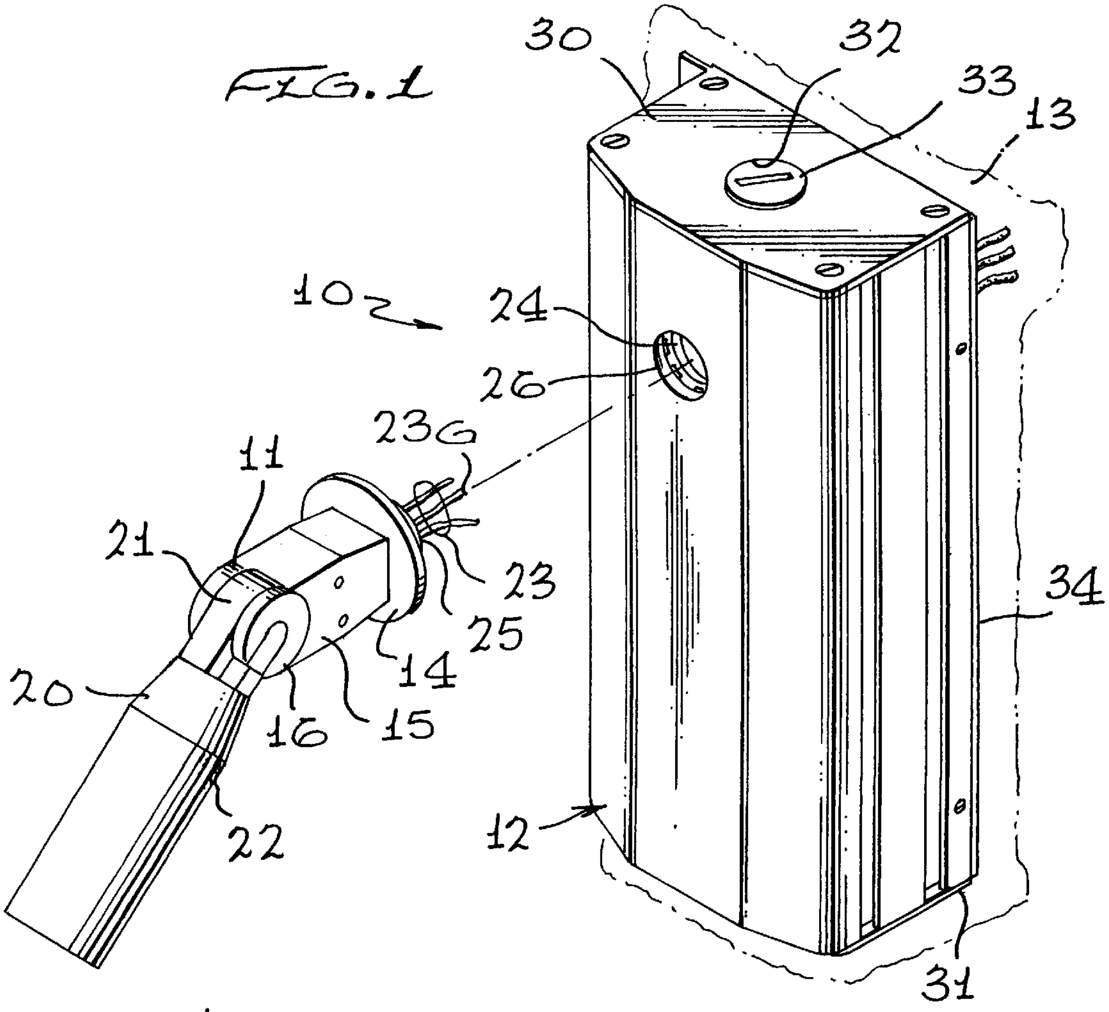
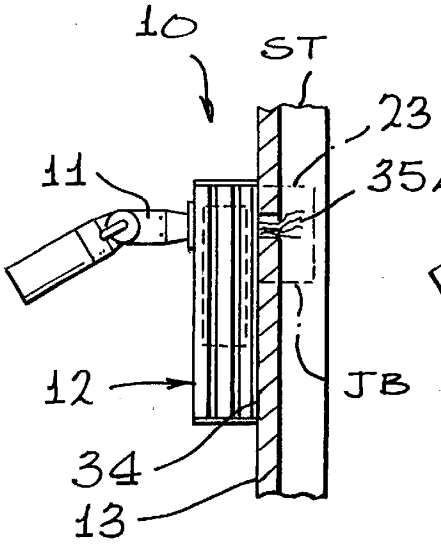
FIG. 2A
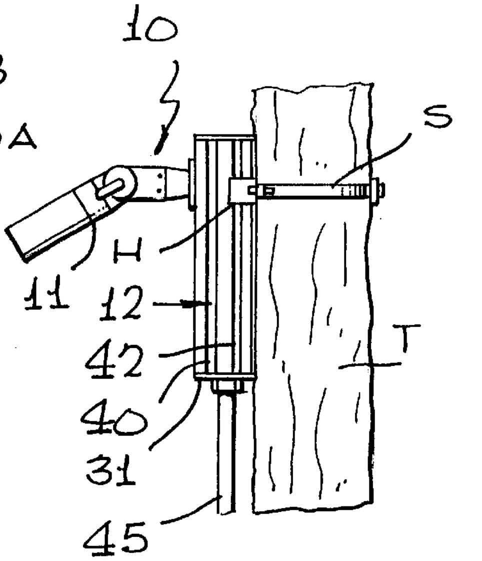
FIG. 2B

FIG. 2C
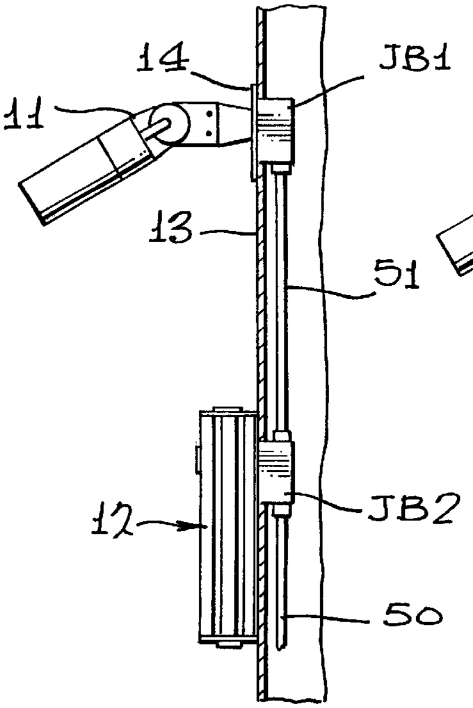
FIG. 2D
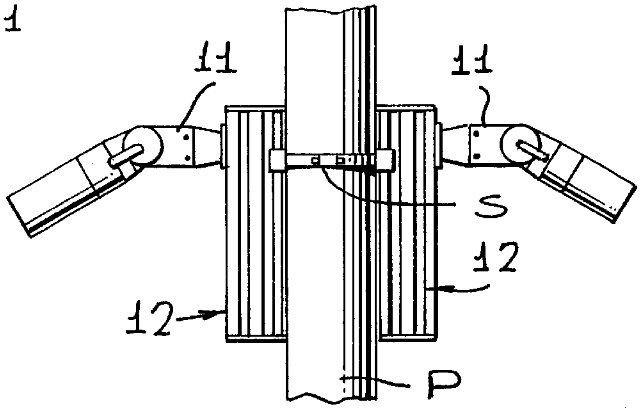
FIG. 2E
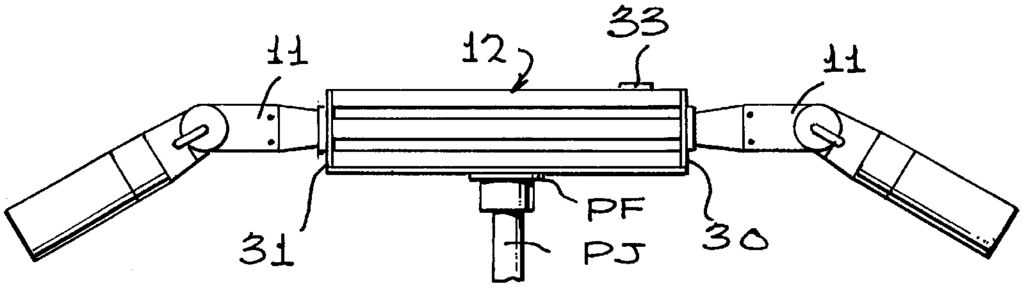
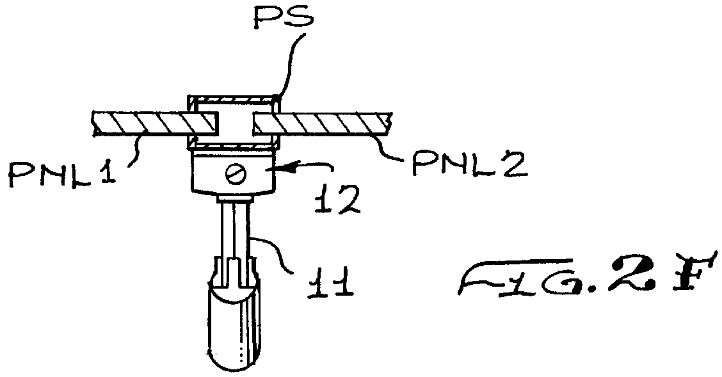
FIG. 2F

BALLAST HOUSING HAVING PIVOTALLY ENGAGING MOUNTING MEANS

FIELD OF THE INVENTION

This invention relates to the field of ballast housings for lighting fixtures.

BACKGROUND OF THE INVENTION

An important and really essential part of many lighting systems is the electronic or electromagnetic element commonly referred to as the ballast. Ballasts are used in fluorescent fixtures, and others which require different voltage, current or frequency for operation than the normal 115 v 60 Hz line voltage provided by the standard United States lighting circuits. Also, low voltage, such as 12V lamps require a step-down transformer between the power outlet and the lamps serviced.

The ballast or the step-down transformer, hereinafter referred to as the ballast, usually constitutes a rather bulky, heavy part of the system as compared with the lamps and their fixtures. In the case of standard fluorescent fixtures, which are recessed into a ceiling, the ballasts are normally concealed within the lamp housing and do not present any mounting problems, but often are different to service or replace.

In the case of ornamental or internal fixtures, there is seldom sufficient room to mount the ballast in the fixture. Often the attractive appearance of the fixture would be sacrificed if the ballast were present in the fixture. Likewise, cooling of the ballast by air convection or other means is often a requirement, so mounting of a ballast near a heat-generating lamp or lamps is undesired.

In many cases, the mounting of lamp fixture, which uses a ballast near interior partitions, is often a requirement, and has been difficult to meet. One other challenge to the lighting designer and the installer is to provide a fixture design that is easy to install and service and that also allows electrical inspection without interfering with the installation.

BRIEF DESCRIPTION OF THE INVENTION

Faced with this state of the art and these requirements, it is an object of this invention to provide improved ballast housing for lighting fixtures.

Another object of this invention is to provide a ballast housing which serves as the mounting structure for a large variety of lamp fixtures and with a variety of modes of mounting any one of the fixtures in a manner which adds to, rather than detracts from, the overall appearance of the fixture, ballast and mounting structure.

Still another feature of this invention is to provide a single ballast housing configuration which receives a large variety of ballasts and which provides effective, conductive cooling for any one of them.

One other feature of this invention is that the ballast housing may be mounted directly on an outlet or junction box, totally concealing it and yet allowing easy inspection and servicing of the connections to the lighting fixture without disturbing the mounting of the fixture or removal of the ballast.

These and other objects of this invention are accomplished by a ballast housing, which is formed of an aluminum extrusion of length determined by the ballasts contained therein. Since the housing is an extrusion, it can readily be made of any desired length and closure members for each end will fit housings of any length. Other suitable metals or alloys could be used.

BRIEF DESCRIPTION OF THE DRAWINGS

This invention may be more clearly understood from the following Detailed Description of the Invention and by reference to the drawings, in which:

FIG. 1 is a perspective view of a lamp and ballast assembly with the lamp exploded from the ballast housing;

FIGS. 2A–2F illustrate six different ways of mounting the ballast housing of FIG. 1;

DETAILED DESCRIPTION OF THE DRAWING

Figure 3:
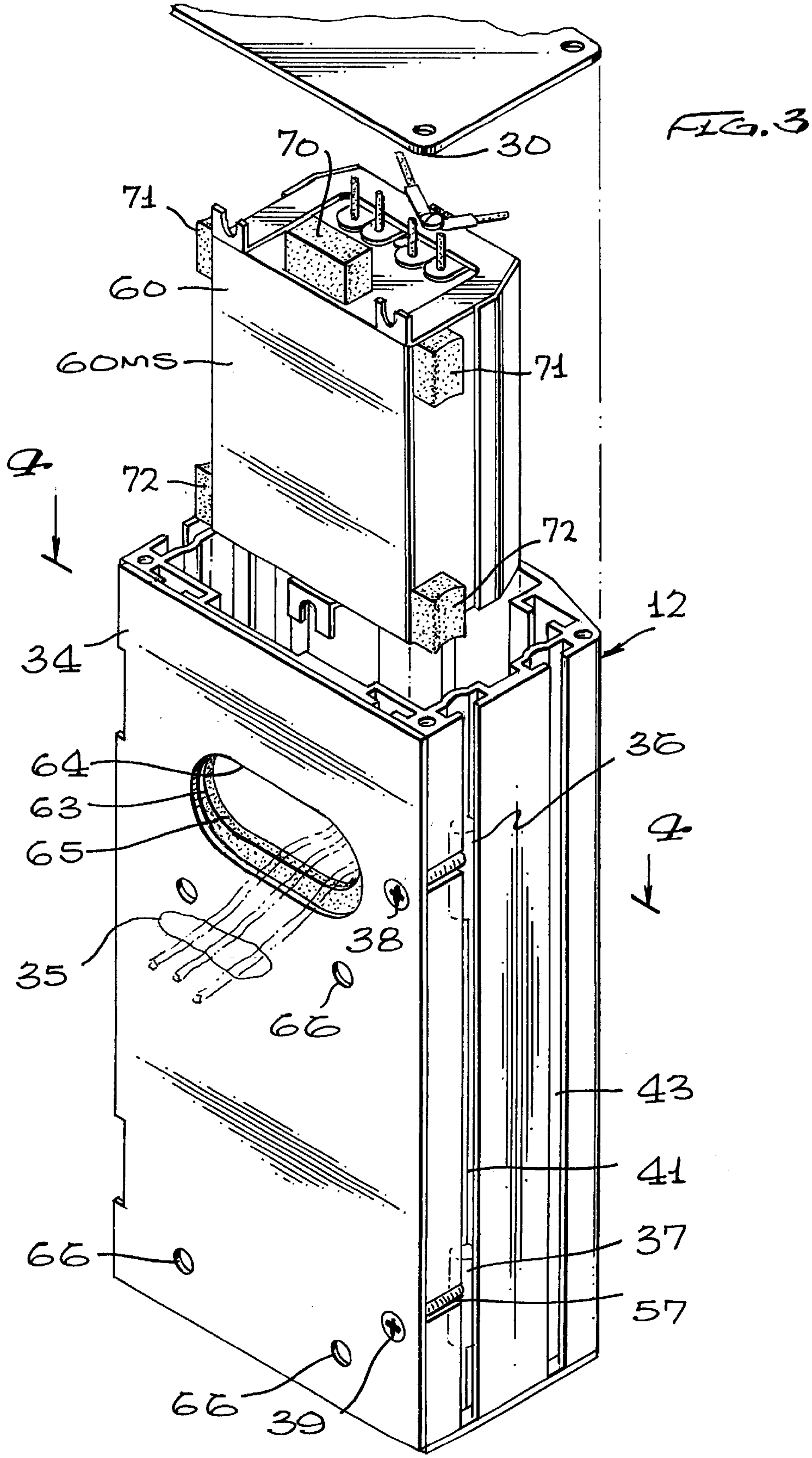
FIG. 3 is a perspective view from the left rear side of the ballast housing of FIG. 1 with a ballast and a top plate shown exploded therefrom.

FIG. 1 shows a lamp and ballast assembly, generally designated 10, with a lamp subassembly 11 exploded from the ballast housing 12, which is mounted on a wall 13 shown in dash-dot lines. The lamp subassembly 11 includes the base plate 14 and outwardly extending mount 15, with the fixed half of a swivel joint 16. The lamp base generally designated 20 encloses a light source (not shown in the drawing) and includes the mating half 21 of the swivel joint 16. A decorative and functional hood 22 extends from the base 20 to concentrate the light beam from the enclosed lamp in the direction intended. Extending out of the base plate 14 are a pair of lamp leads 23, plus a ground lead 23G, for powering the lamp. These details of the lamp and its housing are all in accordance with well-known lighting practice.

The ballast housing 12 is an elongated, preferably metal, enclosure with the least one fixture receiving opening 24 in its outer surface. This opening 24 is in a standard dimension and threaded to receive the mating threaded tubular stud 25 of the lamp assembly 11, and includes a locking nut 26 partly visible within the housing 12 to secure the base plate 14 and its stud 25 in place with the lamp leads 23 extending inside of the ballast housing 12.

Top and bottom plates 30 and 31 close the ends of the ballast housing 12, and each may include a threaded opening 32 for mounting additional fixtures or connectors, such as stud 25 and leads 23 with the lighting fixture module in the top or the bottom of the ballast housing. When not used, the openings 32 are each closed by a conventional threaded plug 33, which engages the threads of any of the openings 24 and 32. For external use, a weather gasket is located between the ends of the housing 12 and plates 30 and 31. The plates 30 and 31 are held in place with conventional corner located screws, the heads of which appear in FIG. 1 or by other means. Four screws are shown in place holding plate 30, which is weather sealed against the top end of housing 12.

The fixture 20 may be electrically grounded to ballast housing 12 when it is of metal via the threaded engagement of the tubular stud 25 in the opening 24 or by the separate ground lead 23G shown in dashed lines between the leads 23.

Figure 4:
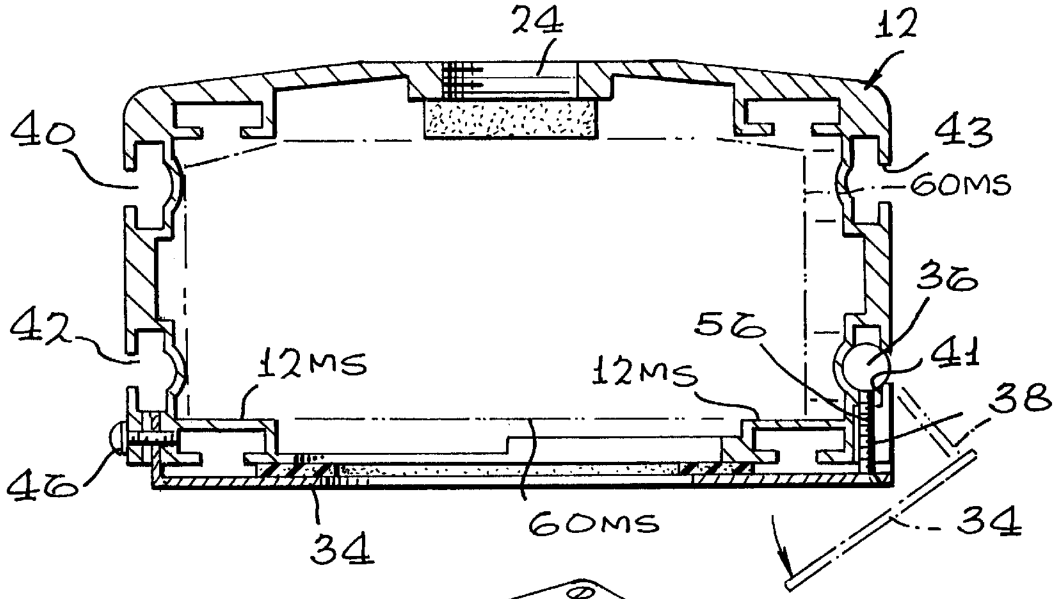
FIG. 4 is a cross sectional view taken along line 4—4 of FIG. 3.

Barely visible at the rear of the ballast housing 12 is a rear mounting plate 34 with a lead opening not shown in FIG. 1 but appearing in FIGS. 3 and 4 providing a route for three power leads 35 to enter from the other side of the wall 13 into the ballast housing 12. Typically, the three power leads or wires 35 are from the ballast and are typically connected by wire nuts (not shown) to the power leads 35, which are located in a junction box in the wall 13 as best seen in FIG. 2A. The mounting plate 34 is actually hinged to the ballast housing 12 by a hinge assembly best seen in FIG. 4 and described as to operation in relation to FIGS. 3 and 5.

FIGS. 2A–2F are illustrative of six different ways that the ballast housing 12 may be mounted. FIG. 2A shows the classic mount against a planar wall, support by a conventional wood or metal stud ST with a conventional junction box JB mounted in the wall. The ballast housing 12 lies flat against the wall and is secured to wall 13 by its rear mounting plate 34.

In FIG. 2B, the lamp assembly 10 has the ballast housing 12 held to a tree or pole T by a strap S, and includes a pair of hooks H engaging one of a number of longitudinal grooves 40 and 42 on the adjacent side in FIG. 2B. A second hook (not shown) engages their counterpart grooves 41 and 43 on the opposite side of housing 12, which grooves appear in FIGS. 3 and 4. This form of strap mounting may employ the adjustable form of banding which is subject of my co-pending patent application serial number 09/177,417. Power is supplied to the assembly through conduit 45 and enters through bottom plate 31.

FIG. 2C shows the lamp housing 11 and ballast housing 12 separated on the wall 13, with the lamp base plate 14, directly secured on a junction box JB1, with the ballast housing 12 separately located on the same wall mounted on a different junction box JB2, with local power supplied over a conduit 50 to the ballast within the housing 12 and lamp power supplied by the ballast through conduit 51 and junction box JB1. This embodiment is employed whenever it is desired to have the ballast located somewhat remote from the lamp housing.

FIG. 2D is a side elevational view of a pair of similar lamp assemblies 10, each with its own respective ballast housing 12 mounted on a post by straps S. An example of the application of the arrangement of FIG. 2D is to light a walkway from above where poles P are adjacent to the walk.

FIG. 2E illustrates the use of a single ballast box 12 to mount a pair of lamp assemblies 11, one from each of the top and bottom plates 30 and 31 with the opening 24 closed by a plug 33. In this case, a post PJ acts not only as a mount for the ballast housing 12 through a flange PF, but acts as a conduit for power leads 35 as well.

Another and important application of this assembly is illustrated in FIG. 2F, which is a top view, in which the ballast housing 12 is mounted directly to a hollow, vertical panel support PS for panels PNL1 and PNL2. Such an arrangement is common in interchangeable dividers for use in open or office space with a panel support PS acting as both a structural member and an electrical conduit. In this case, the central opening for the panel support can hold a conventional conduit. The ballast housing 12 itself has significant structural strength and may even be modified to act as a panel support by suitable recesses in its outer sidewall.

Figure 5:
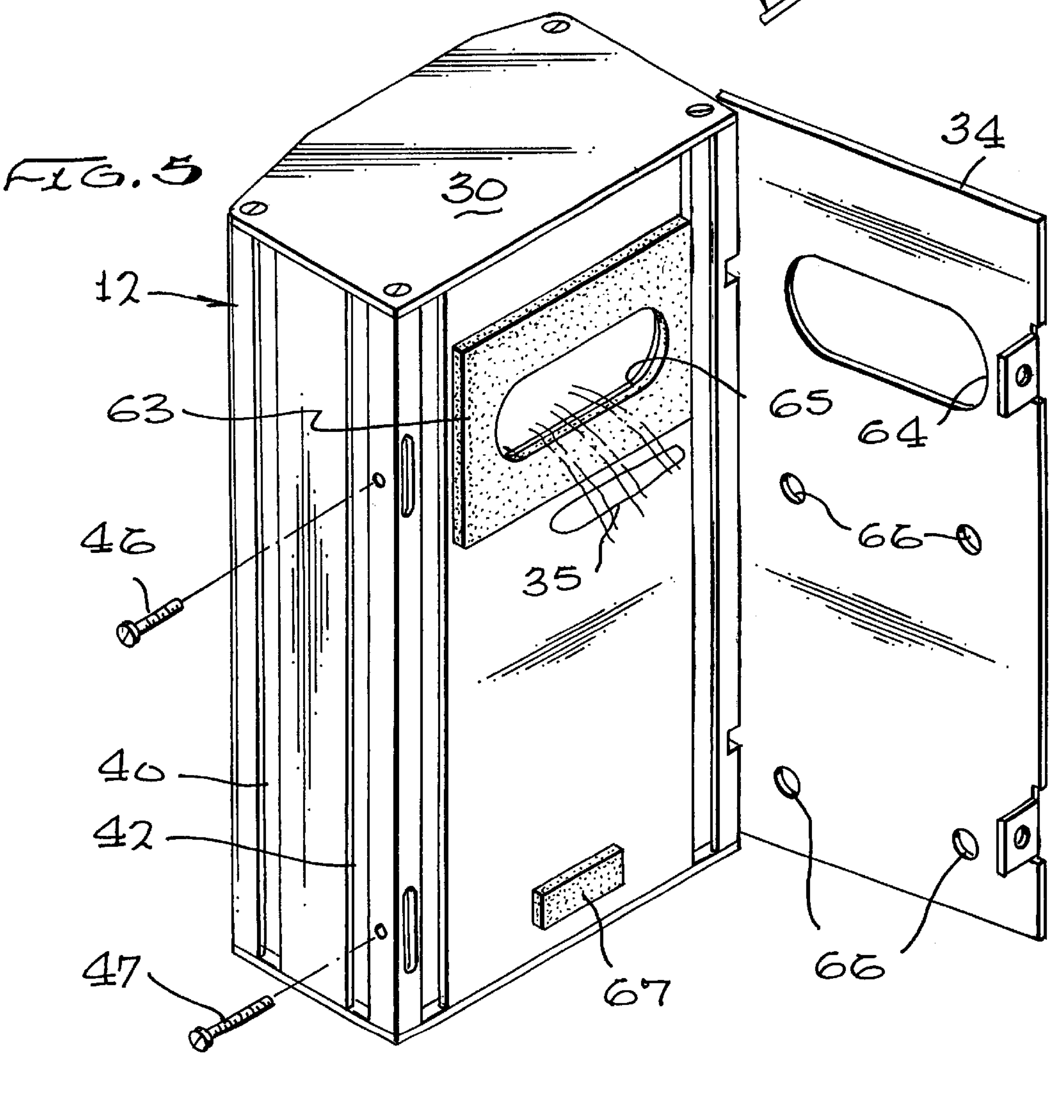
FIG. 5 is a perspective view from the right rear side of the ballast housing of FIGS. 1–4.

Several of the most important features of this invention may be seen in FIGS. 3, 4, and 5. FIG. 3 is a perspective view from the rear of the ballast housing 12 with a typical ballast 60 shown exploded upwardly along with top plate 30. The rear or mounting plate 34 may be opened on its hinges which take the form of pair cylinders 36 and 37. In sectional view, FIG. 4 cylinder 36 is shown located in groove 41 and screw 38, which extends through the mounting plate 34 engages cylinder 36 with enough clearance for the ballast housing 12 to be pivoted away form the mounting plate and its mount when the securing screws 46 and 47 (FIG. 5) have been removed from the opposite edge of housing 12. as shown in FIG. 3, cylinder 37 is also located in groove 41 and is secured in a position by screw 39.

The screws 38 and 39 normally rest in transfer grooves 56 and 57 of FIG. 4 (only screw 38 shows in sectional view FIG. 4) in the ballast housing 12 when the fixture is locked in place. In FIG. 4, the mounting plate 34 is shown in its closed position. When screws 46 and 47 are removed, the housing 12 may pivot away from mounting plate 34 as shown in phantom.

In FIG. 3, the three leads from the ballast housing 12 may be seen extending through an elongated opening 64 in the backing plate 34. A mating opening with a seal 63, also having a mating opening, is located in the rear face of the ballast housing 12. A spacer 65 provides a degree of shock mounting of the ballast housing 12 on its mounting plate 34. A plurality of holes 66 may be seen in the mounting plate 34, which are used to secure the mounting plate and the entire assembly to a wall as shown in FIGS. 2A and 2C.

Note in FIG. 3 that there are a plurality of resilient foam shock mounts, 70, 71 and 72, secured to the ballast 60 with additional shock mounts on the other side of the ballast 60. The shock mounts compress the ballast 60 and mechanically bias the planar mounting surface 60MS of the ballast 60 against the flat mounting surfaces 12MS (FIG. 4) on the rear wall of the ballast housing 12. This provides a large area of direct contact between the mounting surface MS of the ballast 60 and the housing mounting surfaces MS to provide good thermal conduction from the ballast 60 to the housing 12. The ballast housing 12 itself includes large exposed surfaces, which act as a radiator. Even greater radiation surfaces are provided, along with attractive appearance by the slots 41–44. In FIG. 3, a relatively small ballast is shown with a standard size ballast housing 12.

In each case, the power leads, which are shown in phantom in FIG. 3, are readily accessible through the opening 64, with the ballast 60 normally located below the opening 63. In a standard configuration, the ballast housing 12 will accept any ballast having a flat mounting surface, a width of no greater than 3⅝ inch (9.5 cm) and a height of 1¾ inches (4.4 cm). In the preferred form of this invention, the ballast housing is an extrusion and can be of virtually any length, so the ballast length is not a consideration.

A major advantage of this invention is that the entire fixture, including the ballast, may be assembled at the factory or the end assembly and ballast housing 12 may be assembled on site with the simple connection of the lamp leads to the ballast 60 with nut 26 tightened to secure the lamp fixture 11 to the ballast housing 12, and the mounting plate 34 secured to the wall over a junction box containing the power leads. The power leads and the leads from the ballast can easily be connected, while the ballast and light fixture are pivoted away from the wall. The wires and wiring are returned to within the junction box and the ballast housing 12 and fixture pivoted on cylinders 36 and 37 back against the wall, and locking screws 46 and 47 inserted and tightened.

For inspection, the inspector need only remove screws 46 and 47, swing the fixture away, easily examine the electrical connections to meet the code required, and then return the housing 12 to its permanent place by replacing screws 46 and 47. The same feature allows for easy installation and inspection and allows for easy servicing of the fixture, including replacement of the ballast as required. Meanwhile, an attractive ballast and fixture assembly is present.

The foregoing description shows the preferred embodiments of this invention and is representative of its principles but should not be considered as limiting. It is clear that one could, following the teaching of this patent, depart from the physical appearance or structure without departing from the principles of this invention as set forth in the following claims, including the protection afforded by the doctrine of equivalents.

What is claimed is:

1. A ballast housing comprising an elongated hollow generally rectangular cross-section member having a hollow opening therein configured to include sufficient volume to receive a lighting ballast and including at least one surface for direct contact with a surface of the ballast for thermal conduction from the ballast to said housing and means for maintaining said ballast in thermal contact therewith;

closure means for each end of said housing, said housing and closure means including at least one opening therein for receiving and supporting a lighting fixture to be powered by the ballast in said housing;

said housing including at least one other opening therein for passage of power leads for said lighting fixture; and mounting means for said ballast housing comprising a mounting plate pivotally engaging said ballast housing and including an opening therethrough mating with said power lead opening in said housing whereby power may be supplied to the ballast housing through said mating openings and said lighting fixture may be serviced and inspected by pivoting the ballast housing away from said mounting plate without the need to disconnect the power leads.

2. A housing as claimed in claim 1 wherein said at least one of said openings comprises a threaded port.

3. A housing as claimed in claim 1 further comprising a resilient seal surrounding at least one of said openings and positioned between said mounting plate and said body.

4. A ballast housing as claimed in claim 1 wherein the cross section of said housing includes a pair of short sides and a pair of longer sides with longitudinal grooves extending along the short sides thereof for the length of said housing and hinge means are located in one of said grooves for pivotally connecting said mounting plate to said housing.

5. A housing as claimed in claim 4 further comprising a plurality of cylindrical members positioned in one of said grooves and screws threadedly engaged with said mounting plate and said cylindrical members to permit said body to rotate away from said mounting plate.

6. A housing for containing a ballast for lighting fixtures comprising:

an elongated hollow body of generally uniform tranverse dimension throughout, including closure members for each end thereof;

at least one opening therein for mounting a lighting fixture thereon;

at least one additional opening therein for the entrance of power leads;

a mounting plate pivotally secured to a face of said body;

said mounting plate overlying the power lead opening in said body and including a mating opening therein to allow the passage of power leads through both mounting plate and said body; and hinge means for pivoting said body away from said mounting plate.

7. A ballast housing as claimed in claim 6 wherein said power lead opening is sufficiently large that the power leads are not restrained during pivoting of said body for inspection or service of said ballast.

8. A housing as claimed in claim 6 wherein at least one of said openings is in said body.

9. A housing as claimed in claim 6 wherein at least one of said openings is in one of said closure members.

10. A housing as claimed in claim 6 wherein said body includes a plurality of mounting surfaces for contacting and transferring heat from said ballast.

11. A housing for containing a ballast for lighting fixtures comprising:

an elongated hollow body of generally rectangular cross section, said body having a plurality of longitudinal grooves on its exterior surface and at least one flat interior surface of significant area for contact with said ballast to cause said body to act as a heat sink for said ballast and an opening on one side of said body for power leads;

a mounting plate pivotably secured to said body and including an opening overlying the power lead opening in said body;

closure members secured to opposite ends of said body; and at least one opening in said body and said closure members for mounting a lighting fixture thereon.

12. A housing as claimed in claim 11 wherein a pair of cylindrical members are positioned in one of said grooves and threaded members are secured to said mounting plate impinging on said cylindrical members, whereby said threaded members and said cylindrical members serve as hinges to pivotably attach said body to said mounting plate.

13. A ballast housing as claimed in claim 12 wherein said power lead opening is sufficiently large that the power leads are not restrained during pivoting of said body for inspection or service of said ballast.

14. A housing as claimed in claim 11 further comprising a resilient seal surrounding at least one of said openings and positioned between said mounting plate and said body.

15. An electrical equipment housing comprising an elongated member having a generally rectangular cross-section, said member having a hollow opening therein configured to include sufficient volume to receive electrical apparatus to be housed therein from at least one end of said housing and including at least one surface for direct contact with a surface of said electrical apparatus for thermal conduction from said electrical apparatus to said housing and means for maintaining said ballast in thermal contact therewith;

closure means for each end of said housing;

said housing and closure means including at least one opening therein for receiving and supporting an electrical fixture to be powered by the electrical apparatus in said housing;

said housing including at least one other opening therein for receiving power leads for said electrical fixture; and mounting means for said housing comprising a mounting plate pivotally engaging said housing and including an opening aligned with said power lead opening in said housing whereby power may be supplied to the housing and the fixture through said aligned openings and said fixture may be serviced or inspected by pivoting the housing away from said mounting plate without the need to disconnect the power leads.

16. A housing as claimed in claim 15 wherein said housing is hinged to said mounting plate.

17. A housing as claimed in claim 15 wherein the cross-section of said housing includes a pair of short sides and a pair of longer sides, at least one groove extending along said short sides for the length of said housing and a plurality of cylindrical hinge members are located in one of said grooves for pivotally connecting said mounting plate to said housing, screws passing through said mounting plate which are tightened for securing said mounting plate against said housing and which are loosened to permit said housing to pivot away from said mounting plate.

18. A housing as claimed in claim 15 wherein housing is a metal extrusion.

* * * * *